United States Patent Office 3,046,414
Patented July 24, 1962

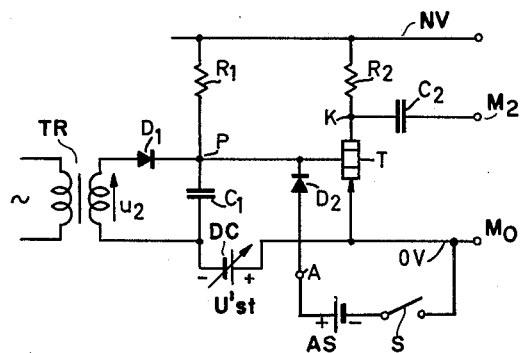
Fig. 1
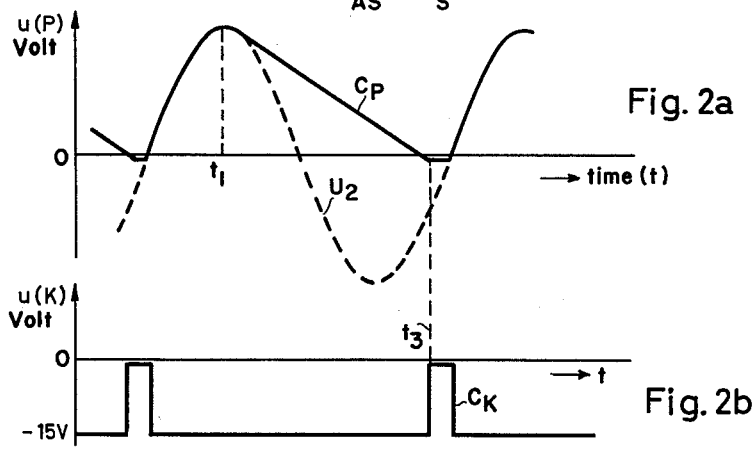
Fig. 2a
Fig. 2b
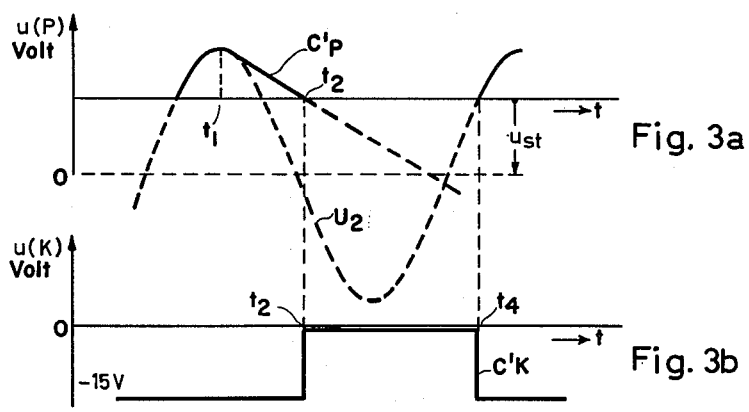
Fig. 3a
Fig. 3b

3,046,414
PULSE GENERATOR FOR PRODUCING PERIODIC PULSES OF VARYING WIDTH FROM AN ALTERNATING VOLTAGE
Wolfgang Meissen, Erlangen, Germany, assignor to Siemens-Schuckertwerke Aktiengesellschaft, Berlin-Siemensstadt, Germany, a corporation of Germany
Filed Apr. 13, 1961, Ser. No. 102,696
Claims priority, application Germany Apr. 16, 1960
4 Claims. (Cl. 307—88.5)

My invention relates to a pulse generator for producing periodic pulses whose period of recurrence is determined by an alternating voltage and whose individual pulse duration can be varied for control purposes.

Such pulse generators are known, for example, from my paper "Steuerung von Quecksilberdampf-Stromrichtern mit Transistor-Gittersteuersätzen" (Control of Mercury-Vapor Current Rectifiers With Transistorized Grid Control Sets) published in the German periodical VDE-Fachberichte, volume 20, 1958, pages 102 to 108. According to these known pulse-generating systems, a pulse is derived from the zero passage of an alternating voltage and is applied, for example, for the control of current rectifiers. The phase position of the zero passages and thus the phase position of the pulses can be shifted with the aid of an additional variable direct voltage. The available phase-shift range depends upon the wave shape of the alternating voltage. With a sinusoidal wave, the practically utilizable range is about 120° electrical. This range can be somewhat extended by changing the curve shape of the alternating voltage wave.

It is an object of my invention to devise a pulse generator generally of the above-mentioned type which affords a phase displacement of the generated pulses over a range of at least 180° electrical with the aid of extremely simple circuit components.

To this end, and in accordance with a feature of my invention, I provide the pulse generator circuit with a capacitor which is charged from the controlling alternating voltage through a diode and which is discharged through a resistor, and I further provide asymmetrically conducting circuit means which form part of a discharge circuit for the capacitor and which derive the pulses to be issued from the sum of the voltages obtaining respectively at the capacitor and at a variable direct-voltage supply in series with the capacitor.

By virtue of these and the more specific features, set forth with particularity in the claims annexed hereto, the invention provides extremely simple means for extending the phase range of pulse control far beyond the one heretofore attainable with the circuitry of comparable simplicity. This will be more fully understood from the embodiment of a pulse generator according to the invention illustrated by way of example on the accompanying drawing in which:

FIG. 1 is a circuit diagram of the pulse generator.

FIGS. 2a and 2b are explanatory graphs of voltage-time curves relating to pulse-generator operation under conditions where the auxiliary direct-voltage is zero; and FIGS. 3a and 3b are explanatory graphs similar to FIGS. 2a and 2b respectively but relating to pulse-generator operation with an adjusted finite value of the auxiliary direct voltage.

It should be understood that the numerical parameter values herein mentioned with reference to FIG. 1, are to be taken only as examples and can be modified in proper correlation to one another, depending upon the particular requirements.

According to FIG. 1, a capacitor $C_1$ (1 mf.) is charged by an alternating sinusoidal voltage $u_2$ (10 volts peak value) supplied from a transformer TR. A diode $D_1$ is serially interposed so that the capacitor receives unidirectional charging voltage. One pole of capacitor $C_1$ is connected at point P to the negative bus leads NV (−15 v.) of a direct current supply, in series with a resistor $R_1$ (25,000 ohm). The other pole of the capacitor is connected in series with a direct-voltage source DC of variable voltage $u_{st}$ (0–8 v.) to the zero voltage bus lead OV (such as a grounded positive lead) of the direct voltage supply. The point P is also connected with the base of a pnp transistor T whose emitter is connected to the OV bus lead and whose collector is connected in series with a resistor $R_2$ (2,000 ohm) to the NV bus lead (−15 v.).

Connected to the base of the transistor T is a terminal A through a diode $D_2$. Terminal A is connected with the positive pole of an additional direct-voltage source AS (0.5 v.) which may have a relatively small voltage value as explained below. The source AS is normally inactive and is controlled by suitable switching means here schematically illustrated simply by a switch S.

The above-described pulse-generator circuit operates as follows.

During operation, a positive half-wave of the alternating voltage $U_2$, the current-flow direction for this half-wave being denoted by an arrow, charges the capacitor $C_1$ through the diode $D_1$. After the voltage peak value (for example 10 v.) is reached, the diode $D_1$ prevents a discharge of the capacitor through the transformer TR, and the capacitor $C_1$ now discharges through the resistor $R_1$.

FIG. 2a shows the changing potential $C_P$ at point P when the auxiliary direct voltage $U_{st}$ is zero. The potential $C_P$ increases in accordance with the sine wave of the charging voltage $U_2$ up to the peak at the moment $t_1$. Thereafter the potential decays in accordance with an exponential function. After the zero potential is reached at the moment $t_3$, a current flows through the emitter-base portion of the transformer T. The point P therefore remains on zero potential until the alternating voltage $U_2$ again turns positive and commences charging the capacitor $C_1$. The slight voltage drop (about 0.2 v.) across the emitter-base portion of the transformer is neglected in the graph and does not appreciably affect the operation.

As soon as the emitter-base portion of the transistor T conducts current, the entire transistor becomes conductive and thus opens its circuit. As a result, the potential at the collector point K jumps from −15 v. to about the voltage zero value. This pulse can be taken off the collector in any suitable manner, for example through the illustrated capacitor $C_2$ (0.1 mf.) and is available between the output terminals $M_2$ and $M_0$. The unidirectional pulse thus generated is shown at $C_K$ in FIG. 2b.

If now, as shown in FIG. 1, a negative direct voltage $u_{st}$ is interposed between the OV bus lead and the capacitor $C_1$, then the potential of point P reaches the zero value at an earlier moment $t_2$ (FIG. 3a). Consequently, the transistor T also switches to closed condition at the earlier moment. Now the jump in potential at point K from −15 v. to zero takes place correspondingly earlier, as is apparent from the pulse curve $C'_K$ shown in FIG. 3b. Accordingly, the pulse issued by the generator circuit at terminal $M_2$ also commences at an earlier moment.

By varying the magnitude of the voltage $u_{st}$ (within a range of about 0 to about 8 v. in the above-described example) a pulse front displacement or a widening of the pulse duration can thus be obtained over a large range. Relative to the controlling alternating voltage $u_2$, the conveniently utilizable range of pulse-front displacement is approximately 200° electrical. Consequently, the invention affords, for example, the provision of a grid control unit for power-current rectifiers which achieves a desirable wide range of phase-shift in delayed-commutation control by means of utmost simplicity. The expenditure in components and space is extremely slight, and the attainable accuracy is satisfactorily high.

It will be understood from the foregoing that the components $D_2$, A, AS and S, shown in FIG. 1, are optional. They afford the further advantage of entirely stopping the pulse generation as may be desirable in the event of trouble. If a slight positive voltage is applied to the terminal A, the base of the transistor T remains continuously positive, and the transistor T remains closed continuously so that no pulse is issued.

The illustrated pulse generator circuit can also be given reverse polarities. That is, it may be equipped with an npn transistor instead of the pnp transistor in which case the bus lead NV may have a potential of +15 v., the direct voltage $u_{st}$ has reverse polarity, and the forward direction of the two diodes $D_1$, $D_2$ is also reversed. The performance of such a modified circuit remains the same.

It will be obvious to those skilled in the art, upon a study of this disclosure, that such and other minor changes in circuitry, as well as any desired changes in parameter values, can be made, and hence that the invention can be given embodiments other than particularly illustrated and described herein, without departing from the essential features of my invention and within the scope of the claims annexed hereto.

I claim:

1. A pulse generator for producing periodic pulses from an alternating voltage comprising alternating-voltage supply means, a capacitor, a charging circuit connecting said capacitor with said voltage-supply means and having a diode in series with said capacitor, a discharging circuit connected to said capacitor and comprising a resistor and a variable direct-voltage source in series with said capacitor for discharging said capacitor through said resistor and forming from the capacitor voltage and the direct voltage a sum voltage whose zero passages have a phase position controllable by variation of said direct-voltage, and a pulse output circuit connected with said discharge circuit for deriving intermittent pulses from said sum voltage.

2. A pulse generator for producing periodic pulses from an alternating voltage, comprising alternating-voltage supply means, a capacitor, a charging circuit connecting said capacitor with said voltage-supply means and having a diode in series with said capacitor, a discharging circuit connected to said capacitor and comprising a resistor and a variable direct-voltage source in series with said capacitor for discharging said capacitor through said resistor and forming from the capacitor voltage and the direct voltage a sum voltage whose zero passages have a phase position controllable by variation of said direct-voltage, a switching transistor having a collector and having an emitter-to-base circuit connected in said discharge circuit so as to be impressed by said sum voltage, and a pulse output circuit connected to said collector for deriving intermittent pulses from said sum voltage.

3. A periodic pulse generator comprising a pair of constant direct-voltage leads, a resistor, a switching transistor having an emitter-collector circuit connected across said two leads and including a series resistor, a pulse output circuit connected to said emitter-collector circuit at a point between said resistor and said transistor to receive direct-voltage pulses due to periodic opening and closing of said transistor, alternating-voltage supply means, a capacitor, a charging circuit connecting said capacitor with said voltage supply means and having a diode in series with said capacitor, a source of variable direct voltage connecting one side of said capacitor with the one of said leads that is connected with the emitter of said transistor, the other side of said capacitor being connected with the base of said transistor, and another resistor connecting said other side of said capacitor with said other lead, said capacitor and said source forming serially part of the base-emitter circuit of said transistor whereby the phase position of the individual output pulses depends upon the sum of capacitor voltage and variable voltage and is controllable by changing said variable voltage.

4. A pulse generator according to claim 3, comprising an additional direct-voltage supply circuit connected parallel to said emitter-to-base circuit and having its positive potential at the base of said transistor, said latter circuit comprising normally open switching means for applying said positive potential to said base to thereby suppress the issuance of pulses to said output circuit.

References Cited in the file of this patent

UNITED STATES PATENTS 2,942,123    Schuh _____ June 21, 1960